United States Patent [19]

McCarthy

[11] Patent Number: 4,561,303

[45] Date of Patent: Dec. 31, 1985

[54] MASS AIRFLOW SENSOR WITH BACKFLOW DETECTION

[75] Inventor: Shaun L. McCarthy, Ann Arbor, Mich.

[73] Assignee: Ford Motor Company, Dearborn, Mich.

[21] Appl. No.: 678,935

[22] Filed: Dec. 6, 1984

[51] Int. Cl.⁴ .................... G01F 1/68; H01L 35/00
[52] U.S. Cl. ............................. 73/204; 29/573; 156/644; 156/662; 427/123
[58] Field of Search ............... 73/204; 29/573; 156/644, 657, 662; 427/123, 125

[56] References Cited

U.S. PATENT DOCUMENTS 4,129,848 12/1978 Frank et al.
4,373,386  2/1983 Suhuddemat .................. 73/204
4,478,076 10/1984 Bohrer .
4,478,077 10/1984 Bohrer et al. .

OTHER PUBLICATIONS

"Silicon Micromechanical Devices", by James B. Angell, Stephen C. Terry and Phillip W. Barth, Scientific American Magazine, Apr. 1983, pp. 44-55.

Primary Examiner—Herbert Goldstein
Attorney, Agent, or Firm—Peter Abolins; Robert D. Sanborn

[57] ABSTRACT

A mass airflow sensor with backflow detection includes a first, second, and third elongated, relatively thin silicon members generally parallel to each other and spaced from each other in an orienting plane. The second silicon member, between the first and third silicon members, has a metal coating for carrying a heating current. The first and third silicon members each have a thermocouple formed thereon so as to detect temperature differences on either side of the second silicon member and thus the direction of airflow across the metal second silicon member.

10 Claims, 7 Drawing Figures

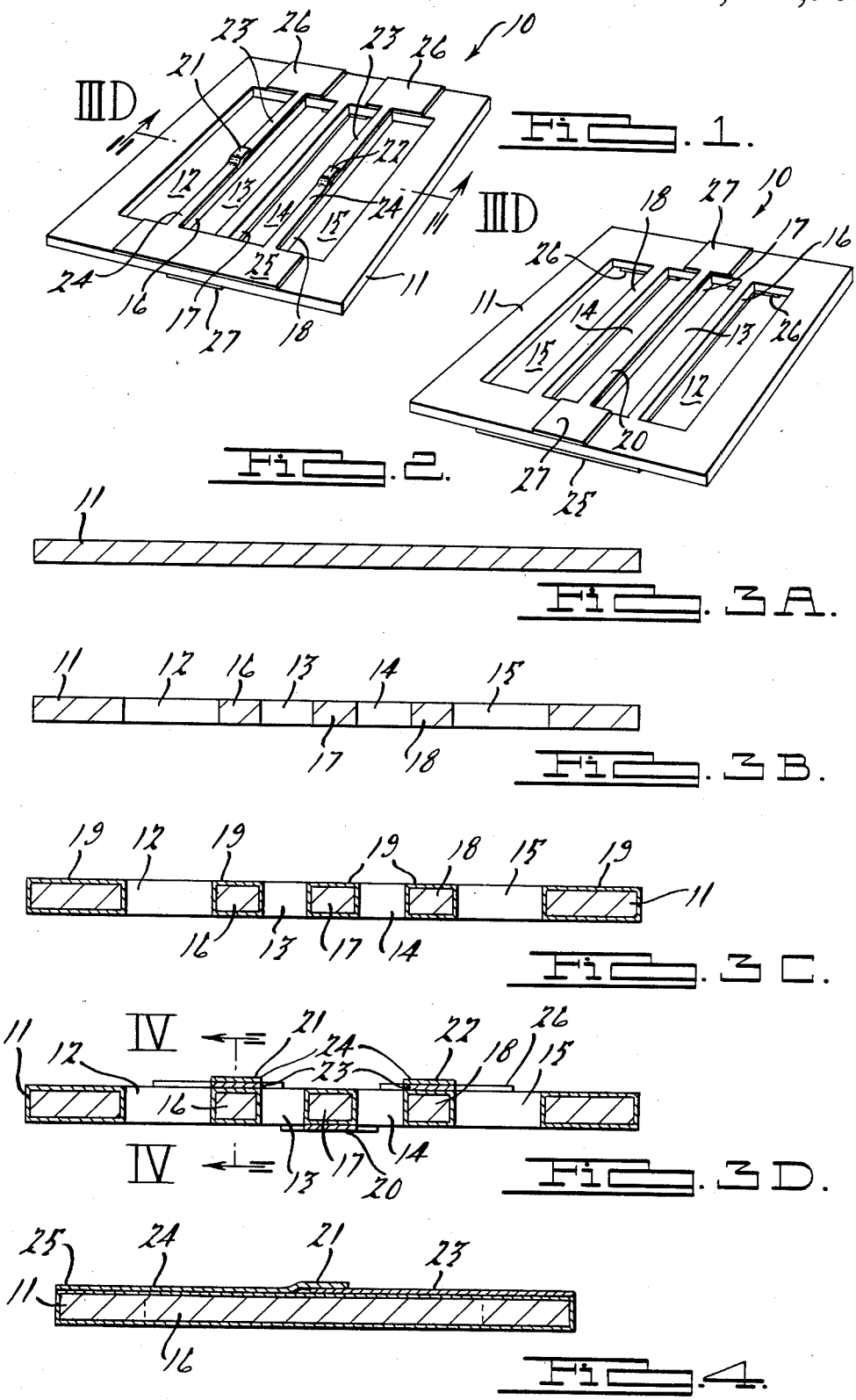

MASS AIRFLOW SENSOR WITH BACKFLOW DETECTION

BACKGROUND OF THE INVENTION

1. Field of the Invention

This invention relates to measuring air flow.

2. Prior Art

Known airflow meters include a hot film anemometer sensor. In accordance with such hot film wire or hot film anemometry, a thin film wire sensor is deposited on the substrate such as quartz or glass. It is also known to use a very fine platinum or tungsten wire freely supported or wound on a ceramic bobbin and maintained at a certain temperature above the intake air temperature by electronic sensing and feedback circuits. Any change in the airflow alters the cooling effect of the air on the heated wire. An electronic circuit can sense this change in heat transfer rate and record changes in the heating current to maintain the temperature of the wire at a set value.

Hot film anemometer sensors have generally had a low speed of response as a result of the low thermal conductivity of the quartz glass or fiber. Further, great care must be taken in handling the fine wire or quartz fiber in manufacturing the sensor elements. This results in limited manufacturing production capacity and increased unit costs.

U.S. Pat. No. 4,129,848 issued to Frank et al teaches a platinum film resistor device. A layer of quartz, deposited upon an insulative substrate, is sputter etched to produce etch pits in the surface thereof. A layer of platinum is deposited over the quartz layer. A second layer of quartz is deposited over the layer of platinum and the second layer of quartz is masked and chemically etched away in the regions where the platinum layer is to be removed. The exposed platinum and a portion of the second quartz layer are then sputter etched away leaving the platinum in a predetermined configuration.

A typical mass airflow system for an automotive application uses one thermal sensor element and cannot distinguish the direction of airflow. Under certain operating conditions, however, such as high acceleration rates and heavy loads at low RPM when there is intake and exhaust valve overlap in certain engines, there is a net flow of air in the reverse direction for a brief period of time. Since the fuel metering for a cycle is dependent upon the air charge of the previous one, a backflow condition can result in significant errors if this contribution is not separated from the normal mass airflow signal. Attempts have been made to infer the amount of backflow by analysis of the electronic signal from the airflow systems, but this has not been totally satisfactory.

There still remains a need for an airflow sensor for detecting backflow and having a good thermal conductivity which can be made at a very low unit cost with high reliability. Further, it would be advantageous to have such a backflow air sensor which reduces system costs and improves overall system reliability as well as increasing packaging efficiency. These are some of the problems this invention overcomes.

SUMMARY OF THE INVENTION

A mass airflow sensor with backflow detection includes a first elongated, relatively thin silicon member positioned in an orienting plane and second and third elongated, relatively thin silicon members positioned in the orienting plane. The first silicon member has a silicon oxide coating and a metal coating. The second and third silicon members are positioned one on each side of the first silicon member and each have a silicon coating and each have a thermocouple metal coating. The thermocouple coating includes a first metal coating at a first end of the second and third silicon members and a second metal coating at a second end of the second and third silicon members. The first and second metal coatings have a region of overlap on a portion of the second and third silicon members so as to form a thermocouple.

If a voltage is measured across the series combination of the second and third silicon members, the voltage indicates a temperature difference between the two junctions. The voltage will be positive or negative in polarity depending upon the connection polarity in which junction is at a higher temperature. The sensor is mounted in the airflow so that one junction is directly upstream of the first silicon member, which can be heated, and the other element is downstream. In normal operation, the upstream junction will be at the ambient air temperature. The downstream junction will be at some temperature above the ambient warmed by the air heated by the first silicon member. Thus, a voltage of particular polarity will occur. If there is a change in the airflow direction such as in the backflow condition, the roles of the two thermocouples are switched.

Such a backflow sensing device is advantageous and can use a low-cost configuration because of the use of planar silicon processing techniques, common to the semiconductor microelectronics industry. Conventional photolithographic techniques can be used in processing. Because the thermal conductivity of the silicon is comparable to that of platinum, the speed of response is comparable to that of platinum hot wire sensor. The use of fabrication technology known in microelectronics industry applications results in low unit costs and high reliability because of the ease of large scale batch processing methods. In addition, fabricating the sensor out of silicon permits the incorporation of any signal conditioning electronics further reducing system costs and improving overall system reliability as well as increasing packaging efficiency.

BRIEF DESCRIPTION OF THE DRAWINGS

FIG. 1 is a top perspective view of an airflow sensor in accordance with an embodiment of this invention;

FIG. 2 is a bottom perspective view of an airflow sensor in accordance with an embodiment of this invention;

FIGS. 3A, 3B, 3C and 3D show sequential fabrication of a sensor in accordance with an embodiment of this invention, along section line III—III of FIG. 1; and FIG. 4 is a section along line IV—IV of FIG. 3 of a thermocouple metal coating in accordance with an embodiment of this invention.

DETAILED DESCRIPTION OF THE INVENTION

Referring to FIG. 1, a mass airflow sensor 10 includes a generally planar silicon substrate 11 having spaced openings 12, 13, 14 and 15. Intermediate opening 12 and 13 is an elongated silicon wire member 16. Intermediate openings 13 and 14 is an elongated silicon wire member 17. Intermediate openings 14 and 15 is an intermediate elongated silicon wire member 18. Silicon substrate 11, including wire-like members 16, 17 and 18, is oxidized forming a layer of silicon dioxide 19 thereon. On top of the oxide layer 19 on silicon members 17 is formed a heating metal layer 20. On top of each of the silicon oxide layers 19 on silicon members 16 and 18 are formed metal thermocouples 21 and 22 each having a first metal layer 23 at one end of the wire-like members 16 and 18 and an overlapping metal layer 24 at the other end of the silicon wire-like member. The ends of metal layers 24 opposite from metal layer 23 are joined together by a contact 25. A contact 26 is formed at the end of metal layer 23 opposite from metal layer 24. Contacts 27 are formed at opposite ends of metal layer 20 on silicon member 17.

In operation, mass airflow sensor 10 is mounted in an airflow so that one of junctions 21 or 22 is directly upstream of hot film element 17 and the other is downstream. In normal operation, the upstream junction will be at the ambient air temperature. The downstream junction will be at some temperature above the ambient warmed by the air heated by the hot film element member 17. Thus, a voltage of a particular polarity will be apparent across contacts 26. If there is a change in airflow direction such as in a backflow condition, the roles of the two thermocouples 21 and 22 will be switched in the polarity and will respond to backflow. Electronic logic can be incorporated so that with the aid of such integrated differential thermocouple, the mass airflow sensor system can accurately account for backflow.

The two metal film coatings prepared for use in connection with the thermocouple junctions at the central region of the silicon members are typically copper and Constantan alloy (which is 55% copper and 45% nickel). Substrate 11 can be etched using fabrication techniques to form silicon wire-like members with dimensions in the range of 0.05 millimeters diameter to 3 millimeters long. The typical thickness of a coating of silicon dioxide 19 is less than about 0.5 microns. The silicon dioxide layer electrically insulates the metal layers from the silicon substrate 11. The thin oxide coating does not appreciably reduce the speed of response of the resulting mass airflow sensor 10.

Various modifications and variations will no doubt occur to those skilled in the various arts to which this invention pertains. For example, the size of the substrate may be varied from that disclosed herein as well as the openings as disclosed herein. These and all other variations which basically rely on the teachings through which this disclosure has advanced the art are properly considered within the scope of this invention.

I claim:

1. A mass airflow sensor with backflow detection including:
    a first elongated, relatively thin silicon member positioned in an orienting plane, having a silicon oxide coating and having a metal coating;
    a second and a third elongated, relatively thin silicon members positioned in the orienting plane, one on each side of said first silicon member, having a silicon oxide coating and each having a thermocouple metal coating; and
    said thermocouple coating including a first metal coating at a first end of said second and third silicon members and a second metal coating at a second end of said second and third silicon members, said first and second metal coating having a region of overlap on a portion of said second and third silicon members so as to form a thermocouple.

2. A mass airflow sensor with backflow detection as recited in claim 1 further comprising a generally planar silicon substrate integral with said first, second and third silicon members, said first, second and third silicon members being generally parallel and extending across an opening in said silicon substrate.

3. A mass airflow sensor with backflow detection as recited in claim 2 wherein:
    said metal coating on said first silicon member is on a first side, corresponding to a first side of said silicon substrate; and
    said thermocouple metal coating on said second and third silicon members is on a second side, corresponding to a second side of said silicon substrate, opposite from the first side.

4. A mass airflow sensor with backflow detection as recited in claim 3 further comprising:
    a connecting terminal between said first ends of said second and third silicon members located on the second side of said silicon substrate.

5. A mass airflow sensor with backflow detection as recited in claim 4 further comprising:
    a first terminal coupled to the second end of said second silicon member and a second terminal coupled to the second end of said third silicon member for providing coupling across said second and third silicon members.

6. A mass airflow sensor with backflow detection as recited in claim 5 wherein said thermocouple metal is copper on one end and an alloy of copper and nickel on the other end.

7. A mass airflow sensor with backflow detection as recited in claim 1 wherein said alloy is 55% copper and 45% nickel.

8. A method for forming a mass airflow sensor with backflow detection includes the steps of:
    forming four spaced openings in a silicon substrate so that there are defined, between the openings, three generally parallel elongated silicon wire-like members;
    oxidizing the exposed silicon to form a layer of silicon dioxide;
    forming a metal heating element on the central one of said three silicon members;
    forming metal heat detecting thermocouples on the other two outside silicon wire-like members adjacent said central silicon members so as to detect which of said outside silicon members is downstream of said central silicon members.

9. A method for forming a mass airflow sensor with backflow detection as recited in claim 8 further including the steps of:
    forming contact terminals at each end of said central silicon member on a first side of the silicon substrate;
    forming a common contact joining two ends of said outside silicon members on a second side of the silicon substrate, opposite from the first side; and
    forming two end contacts, one at each end of said outside silicon member opposite from the end with the common contact and on the second side of the silicon substrate.

10. A method of fabricating a mass airflow sensor with backflow detection including:
    forming a first and second opening in a silicon substrate, said first and second openings being spaced from each other and defining therebetween a first elongated wire-like silicon member;

forming a third opening spaced from said first opening and defining therebetween a second elongated wire-like silicon member;

forming a fourth opening spaced from said second opening and defining therebetween a third elongated wire-like silicon member;

forming a coating of silicon dioxide on said first, second and third silicon members;

forming a conductive coating on said first silicon member;

forming thermocouple coating on said second and third silicon members so that one end is of a first metal and a second end of a second metal and there is a region of overlap forming a thermocouple; and applying a coupling terminal to the silicon substrate for electrically connecting two ends of said second and third silicon members.

* * * * *